US011421936B2

(12) United States Patent
Zimmermann et al.

(10) Patent No.: US 11,421,936 B2
(45) Date of Patent: Aug. 23, 2022

(54) HIGH-TEMPERATURE ALL-METAL INDUCTION FURNACE, INTENDED TO MELT SAMPLES OF MINERALS AND/OR ROCKS FOR EXTRACTING GASES UNDER ULTRA-HIGH VACUUM

(71) Applicant: CENTRE NATIONAL DE LA RECHERCHE SCIENTIFIQUE, Paris (FR)

(72) Inventors: Laurent Zimmermann, Saint Nicolas de Port (FR); Pierre-Henri Blard, Saint Max (FR)

(73) Assignee: CENTRE NATIONAL DE LA RECHERCHE SCIENTIFQUE, Paris (FR)

( * ) Notice: Subject to any disclaimer, the term of this patent is extended or adjusted under 35 U.S.C. 154(b) by 732 days.

(21) Appl. No.: 16/336,694

(22) PCT Filed: Sep. 7, 2017

(86) PCT No.: PCT/EP2017/072476
§ 371 (c)(1),
(2) Date: Mar. 26, 2019

(87) PCT Pub. No.: WO2018/059902
PCT Pub. Date: Apr. 5, 2018

(65) Prior Publication Data
US 2021/0302100 A1    Sep. 30, 2021

(30) Foreign Application Priority Data

Sep. 27, 2016  (FR) ...................................... 1659142

(51) Int. Cl.
*F27B 14/04*  (2006.01)
*F27D 11/06*  (2006.01)
(Continued)

(52) U.S. Cl.
CPC .............. *F27B 14/04* (2013.01); *F27B 14/10* (2013.01); *F27D 7/06* (2013.01); *F27D 11/06* (2013.01);
(Continued)

(58) Field of Classification Search
CPC .... F27B 14/04; F27B 14/10; F27B 2014/045; F27B 2014/0837; F27D 7/06
See application file for complete search history.

(56) References Cited

U.S. PATENT DOCUMENTS 2,966,709 A * 1/1961 Winters .................... F27B 5/04
                                                  164/150.1
3,300,564 A    1/1967 Junker
(Continued)

FOREIGN PATENT DOCUMENTS

EP    3 029 165 A1    6/2016
FR    1 209 469 A     3/1960
(Continued)

OTHER PUBLICATIONS

International Search Report dated Dec. 12, 2017 from Corresponding International Application No. PCT/EP2017/072476.
Written Opinion dated Dec. 12, 2017 from Corresponding International Application No. PCT/EP2017/072476.
French Preliminary Search Report dated May 30, 2017 from Corresponding French Application No. FR1659142.

*Primary Examiner* — Scott R Kastler
(74) *Attorney, Agent, or Firm* — Pearne & Gordon LLP

(57) ABSTRACT

The application basically comprises supplying a high-temperature ultra-high vacuum furnace, the sole chamber of which is metal, in which an electrically conductive crucible, preferably made of tantalum, is placed onto an insulating support, preferably a ceramic, and is induction heated by a winding wound around the crucible. The insulating tube, preferably made of quartz, that is arranged between the induction winding and the crucible, advantageously acts as a surface on which the condensable species can condense.

(Continued)

The quartz insulating tube especially allows the induction winding to be protected.

11 Claims, 4 Drawing Sheets

(51) Int. Cl.
  *F27B 14/10* (2006.01)
  *F27D 7/06* (2006.01)
  *F27B 17/02* (2006.01)
  *F27B 14/08* (2006.01)

(52) U.S. Cl.
  CPC ......... *F27B 17/02* (2013.01); *F27B 2014/045* (2013.01); *F27B 2014/0837* (2013.01); *F27D 2007/066* (2013.01)

(56) References Cited

U.S. PATENT DOCUMENTS

| | | | |
|---|---|---|---|
| 2013/0220212 A1* | 8/2013 | Kusunoki | C30B 15/30 117/19 |
| 2021/0302100 A1* | 9/2021 | Zimmermann | F27D 11/06 |

FOREIGN PATENT DOCUMENTS

| | | |
|---|---|---|
| FR | 1 595 662 A | 7/1970 |
| GB | 1 521 231 A | 8/1978 |
| GB | 2 217 159 A | 10/1989 |

* cited by examiner

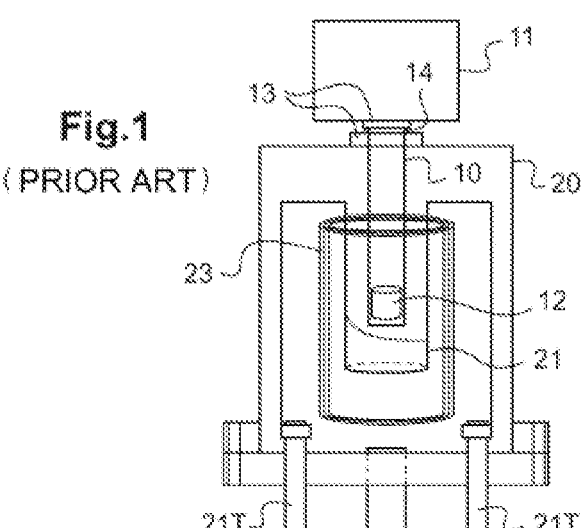
Fig.1 (PRIOR ART)
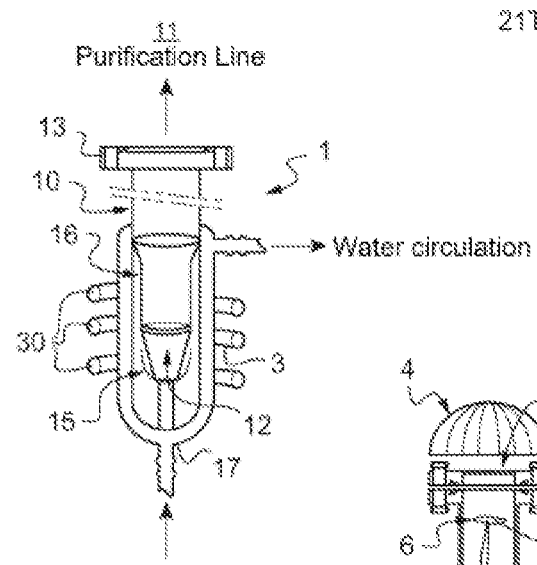
Fig.2 (PRIOR ART)
Fig.3 (PRIOR ART)

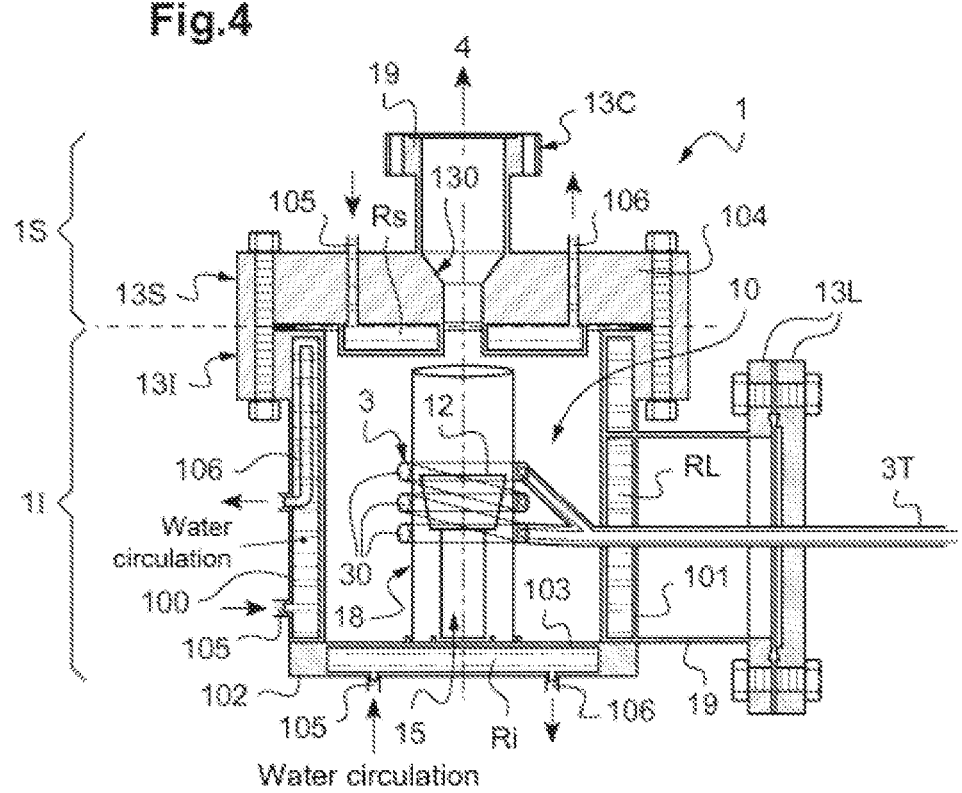

HIGH-TEMPERATURE ALL-METAL INDUCTION FURNACE, INTENDED TO MELT SAMPLES OF MINERALS AND/OR ROCKS FOR EXTRACTING GASES UNDER ULTRA-HIGH VACUUM

TECHNICAL FIELD

The present invention relates to the field of extracting the noble gases present in minerals and/or rocks.

It relates more particularly to a furnace operating by electromagnetic induction heating, at high temperature (HT) and under ultrahigh vacuum (UHV). The expression "high temperature" is understood here and within the context of the invention to mean maximum temperatures of the furnace of at least 1500° C., typically around 1800° C. The expression "ultrahigh vacuum" is understood here and within the context of the invention to mean pressures within the chamber of the furnace of from $10^{-8}$ to $10^{-9}$ mbar, typically a pressure of the order of $5 \times 10^{-8}$ mbar at 800° C.

It aims more particularly to improve the performances of existing HT UHV furnaces and other known extraction systems constituted by lasers.

PRIOR ART

Noble gases are chemical elements belonging to group "0" of the periodic table. These are, under normal temperature and pressure conditions (273 K, 1 atm), monoatomic gases having the respective symbols He (helium), Ne (neon), Ar (argon), Kr (krypton) and Xe (xenon). Their full outer electron shells, containing two electrons for He and eight for Ne—Ar—Kr and Xe, give them a particular physical characteristic, namely chemical inertness with respect to other elements. They are, by this singularity, considered to be excellent leading geochemical and geochronometric tracers. Each noble gas has several isotopes: two for helium ($^{3-4}$He); three for neon ($^{20-21-22}$Ne) and argon ($^{36-38-40}$Ar); six for krypton ($^{78-80-82-83-84-86}$Kr) and finally nine for xenon ($^{124-126-128-129-130-131-132-134-136}$Xe).

The elemental and isotopic composition of these gases has not stopped evolving since the accretion of the earth 4.56 billion years ago, by nuclear reactions whether they are of radiogenic nature (radioactivity), nucleogenic nature (nuclear reactions) or else cosmogenic nature (production of isotopes by interactions with cosmic radiation).

Furthermore, all of the terrestrial reservoirs containing noble gases (atmosphere, crust and surface mantle and deep mantle) have seen their elemental and isotopic compositions change also following:

degassing;
mantle differentiation;
leaks (helium) into space in the upper atmosphere;
human activity since the Industrial Revolution (introduction into the atmosphere of radiogenic helium following the exploitation of fossil fuels (coal, gas, oil) and tritiogenic introduction following nuclear tests in the atmosphere which generated $^3$He by decay of $^3$H).

Studying and understanding the fluid-rock interactions in the crust and/or mantle is a major challenge in geoscience and requires high-performance tools to extract, from rocks and/or minerals, noble gases in order to access the geochemical information needed for understanding the processes cited above.

Several extraction techniques are known; reference may be made to publication [1] which draws up an inventory of the techniques most used in research laboratories that make it possible to access the noble gases trapped in rocks and minerals.

One of the techniques consists in heating samples in order to extract the noble gases contained.

The extraction of the noble gases by heating samples has always been a major challenge to be solved in the field of geosciences. It requires high-performance tools in order to favorably meet the requirements of the laboratories, namely extracting at high temperature the gases trapped in the rocks or in the minerals, as rapidly as possible in a chamber under ultrahigh vacuum where the degassing of the noble gases from the internal surfaces is negligible.

The systems for extraction by heating currently used by the scientific community to carry out the cited extraction can be classified into several categories: either double-walled or single-walled resistance furnaces, bulb furnaces, electromagnetic induction furnaces, the chamber of which is made of glass, and finally lasers. All these known systems are combined with a purification line and a mass spectrometer.

Double-walled resistance furnaces are derived from 1980s technology very common in laboratoires: see for example publication [2], [3].

These are furnaces which use an electric current to heat, by Joule heating, a resistor usually made of tungsten.

Represented in FIG. 1 is such a double-walled HT UHV furnace comprising two independent chambers 10 and 20 that do not communicate with one another.

The first chamber is the outer chamber 20 in which a tungsten resistor 21 powered externally through electrical bushings 21T, is heated by Joule heating.

The radiation emitted thereby enables the high-temperature heating of a second chamber which is a tube made of tantalum (Ta) 10, connected to an ultrahigh vacuum purification line 11 in order to purify the gases which are extracted from a sample heated in a crucible 12 made of metal, for instance made of molybdenum (Mo), tantalum (Ta), magnesium oxide (MgO), alumina ($Al_2O_3$) or boron nitride (BN). The samples present in the crucible may thus be melted at temperatures typically between 1600 and 1800° C.

The ultrahigh vacuum (UHV) purification line 11 comprises chemical adsorption (chemisorption) and physical adsorption (physisorption) traps for purifying the extracted gas. Chemisorption enables the trapping of all the reactive species ($H_2O$, $CO_2$, CxHy, etc.). Physisorption, generally used after chemisorption, enables the separation of the noble gases as a function of their condensation temperature at low temperature on a surface (activated carbon for example).

The outer chamber 20 is connected by means of a flange (not represented) to a turbomolecular pump unit 22, dedicated to the evacuation of the gases, in particular oxygen, inside the outer chamber 20, in order to avoid damaging, by oxidation, the heating resistor 21.

The main advantage of this type of double-walled furnace remains its double vacuum chamber system which facilitates the purification of the extracted noble gases. Specifically, the dihydrogen ($H_2$) produced at high temperature by the tungsten resistor, and which could degrade the efficiency of the chemical adsorption traps used in the purification line 11, is pumped by the pump unit 22.

However, this type of HT UHV furnace from the prior art has many drawbacks that may be summarized as follows.

The tantalum tube 10 is solid with a high mass of Ta. This naturally contains large amounts of noble gases of atmospheric origin, which, by diffusion at high temperature, mar the measurements of noble gases resulting from the samples. The degassing of this tantalum tube is obligatory to reduce the diffusion of noble gases of atmospheric origin into the extraction chamber 20. This operation is often long and tedious.

Moreover, the heating rate of the crucible 12 is slowed down by the tantalum tube which will first absorb the radiation emitted by the resistor in order to rise in temperature. The crucible is then heated by conduction in order to reach the target temperatures, i.e. between 1600 and 1800° C. A time of around 15 to 20 minutes is required to reach these temperatures. The thermal inertia of the large metal mass, consisting of the crucible and of the Ta tube typically of 700 to 800 g, is also an impediment to a rapid cooling of the furnace. 15 to 20 minutes are also required in order to cool the tantalum tube to a temperature below 500° C.

Leaktightness between the Ta tube and the purification line is tricky to obtain and often remains a source of leaks. This leaktightness is achieved using two flat flanges 13 between which a gold gasket 14 is squashed. This connection mode is expensive by the simple fact of using a gold gasket. It is difficult to implement because the positioning of the gold gasket relative to the flanges 13 is tricky. Specifically this would have a tendency to give rise to leaks.

Furthermore, the Ta tube recrystallizes under the effect of the heat. A partial (or total) pumping of the noble gases extracted from the samples in the chamber 10 to the second chamber 20 may occur through cracks resulting from the recrystallization of the tube by means of the secondary pump unit 22. This phenomenon has frequently been observed. It gives erroneous results because it underestimates, by definition, the concentrations of the noble gases measured.

Furthermore, the Ta tube is regularly damaged following the fusion of the silicates present in the samples. The alloys produced between the tantalum and the molten silicates have the effect of reducing the service life of the tantalum tube. The multiplication of the high-temperature heating cycles has the effect of making the tantalum flow toward the base of the tube which deforms by bending. This deformation may prove dangerous for the integrity of the furnace. The periodic replacement of the Ta tube has a significant cost, typically of the order of 1500 Euros (€) per tube. It requires the complete disassembly of the furnace with the risk of damaging the expensive W resistors and the heat shields.

As mentioned above, the first chamber 20 requires a dedicated secondary pump unit in order to protect the resistors from oxidation with the oxygen from the air (destruction of the resistors). This pump unit is an additional cost for this extraction method, which may typically amount to around 5000 €. The maintenance of the pump unit should also be taken into account in the financing thereof, with a cost of around 1500 € per maintenance.

Thus, the total cost of a double-walled HT UHV furnace is very high, not only to purchase, typically estimated by the inventors at around 80 000 € for a turnkey furnace, but also owing to the required maintenance.

To eliminate the problems linked to the tantalum tube used in the double-walled furnaces, the inventors of the present invention have produced a single-walled furnace, as described in patent application FR 2 973 105.

In substance, in this single-walled furnace, a gas-extracting crucible and a heating resistor are in the same UHV chamber. An electric current heats, by Joule heating, a tantalum resistor inserted in which is the crucible that receives the sample, which is made of boron nitride. The crucible is then heated to around 1400-1450° C. by radiation.

Although this single-walled furnace is satisfactory overall, it nevertheless has several drawbacks as follows.

Firstly, the maximum temperature that the furnace may reach is limited to around 1400-1450° C. It is unsuitable for melting refractory samples such as olivines which require a temperature of 1700° C.-1800° C. for the melting thereof. The extraction of the gases in refractory samples such as olivines may however be carried out by diffusion. The particle size of the samples must not however be too coarse otherwise the extraction time will increase drastically. A particle size greater than the 300-500 µm fraction does not make it possible to obtain a satisfactory extraction yield.

Next, the heating resistor is subjected to high mechanical stresses during the heating which weaken it. Its integrity may be protected by gradually increasing the electrical power, but at the expense of a rapid heating. Thus, a duration of 20 to 30 minutes is recommended for reaching the maximum temperature. Despite everything it is observed that this heating resistor is destroyed after 40 to 50 cycles on average. This involves an operating cost linked to its replacement which is not negligible since it is of the order of 350 € per resistor.

Furthermore, the surface finish of the fastenings of the heating resistor to the electrical bushings must be particularly meticulous otherwise the temperature reached by the furnace will decrease.

Lastly, crucibles made of boron nitride have a relative chemical inertness with respect to elements present in the minerals. However it degases large amounts of nitrogen at high temperature. The use of a crucible made of Ta or Mo does not make it possible to reach 1450° C. with this type of furnace.

Electromagnetic induction furnaces are also used for the extraction of noble gases in samples: see in particular publication [4] [5].

Such an induction furnace is represented in FIG. 2. A metal crucible 12 intended to receive the samples is borne by a suitable silica support 15 and held in a double-walled glass chamber 10. The latter is connected to a gas purification line 11 by means of a CF-type flange 13. A tube 16 which enables the guiding of the sample to the metal crucible 12 is arranged on the top of the latter. The metal crucible is the site of induced electric currents when it is subjected to a variable magnetic field provided by an inductor 3, the turns 30 of which on the outside of the chamber 10 surround the crucible 12 over its entire height. Circulation of water in the double wall 17 of the chamber 10 makes it possible to ensure the cooling of the furnace. The currents induced in the metal crucible 12 make it possible to obtain a rapid rise in its temperature up to 1800° C. or even 2000° C. if necessary.

The main drawbacks of this induction furnace are linked to the use of glass for the chamber. Specifically, atmospheric helium will diffuse through the wall of the chamber as glass is a porous material with respect to this element. The residual amounts of helium detected in this type of chamber are therefore, by definition, large, as highlighted in publications [4] and [16], and do not therefore enable an analysis of samples lean in this gas. It is not possible to replace the glass chamber with a metal chamber owing to the arrangement of the induction turns 30 on the outside thereof.

Moreover, the metal crucible 12 rests on a crucible holder 15 which is made of silica. The differences in thermal expansion between the metal and the silica are at the root of the observed fracturings of the crucible holder during the heating cycles. In order to minimize the extent thereof, it is recommended to heat and cool the crucible slowly, which is contradictory with a very rapid temperature rise of the furnace. Typically, a duration of 1 hour approximately is needed to heat the crucible in order for it to reach a temperature of 1800° C.

Finally, the dimensions of the crucible are very limited. Its volume of 2.7 cm$^3$ does not make it possible to melt large amounts of samples.

Bulb furnaces have also been used for the extraction of noble gases: see publication [6]. Represented in FIG. 3 is such a bulb furnace: it operates by means of a halogen lamp 4, the confinement of the light of which in an UHV chamber 10 makes it possible to heat, by radiation, a metal sheet 6 in which there is a sample in the form of a powder or minerals. The light is transmitted into the chamber by means of a viewport 5. The temperature is measured with a thermocouple 7 fastened to a specific bushing. This is welded onto a CF-type flange 13 at the end of the chamber 10. The chamber 10 is connected to a gas purification line 11 by means of another CF-type flange 13.

The main drawback of bulb furnaces is the maximum temperature reached which may not exceed 900 to 1000° C. These temperatures are insufficient for the extraction of the noble gases present in the samples of rocks and/or minerals.

Besides all the known UHV HT furnaces, described above, lasers of $CO_2$, diode and Nd-Yag (neodymium-doped yttrium aluminum garnet) type are very good gas extraction tools. Specifically, they make it possible to rapidly melt a sample by focusing, on its surface, the energy of a laser beam. This technique appears suitable only for the analysis of small samples, the mass of which is between 0.1 g and 150 mg: see publications [7] and [8]. It would therefore be reserved for the most part for samples rich in gas.

There is therefore a need to improve the extraction of the noble gases present in samples of rocks and/or minerals, in particular in order to overcome the drawbacks of the extraction systems according to the prior art as presented in the preamble, in particular with the aim of improving the extraction performance, of enabling an effective extraction and an effective analysis using samples lean in gas, of enabling a rapid temperature rise up to high temperatures of at least 1800° C., of enabling a rapid cooling of the sample after the melting thereof, of enabling easy maintenance in the operating state, while reducing the costs linked to the production and to the maintenance.

The objective of the invention is to at least partly satisfy this need.

SUMMARY OF THE INVENTION

In order to do this, the invention relates, according to one of its aspects, to a high-temperature ultrahigh-vacuum furnace, intended for the extraction of noble gases present in samples of minerals and/or rocks, comprising:
- a metal chamber that is gastight, in particular to atmospheric gases, comprising in the upper portion thereof a connection opening for connecting to a purification line for purifying the gases released in the chamber and/or to a gravity feed device for supplying a sample and, a connection opening for connecting to a pump suitable for creating the ultrahigh vacuum inside the chamber,
- a crucible made of electrically conductive material, suitable for containing at least one sample of minerals and/or rocks,
- a support made of electrically insulating material, resting on the lower portion of the metal chamber, and supporting the crucible at a certain height in the chamber,
- at least one induction coil, powered from outside of the chamber through at least one insulated bushing passing through a wall of the chamber, and arranged around the crucible,
- a tube made of electrically insulating material, resting on the lower portion of the metal chamber, arranged between the induction coil and the crucible supported by the support.

Thus, the invention essentially consists in providing an UHV HT furnace, the single chamber of which is metallic, in which an electrically conductive crucible, preferably made of tantalum, is placed on an insulating support, preferably a ceramic, and heated by induction by a coil wound around. The insulating tube, preferably made of quartz, arranged between the induction coil and the crucible, advantageously makes it possible to serve as surface on which the condensable species may be condensed. The insulating quartz tube especially makes it possible to protect the induction coil. Specifically, large amounts of material from the samples are vaporized in the furnace. If these came to be condensed on the coil, they would fill in the spacing between the turns of the induction coil which would end up touching. The consequence of this phenomenon would probably be a short circuit that would probably induce a drop in the temperature of the crucible.

The furnace according to the invention makes it possible to solve all the extraction problems encountered in research laboratories for rapidly extracting, under satisfactory analytical conditions, the noble gases trapped in the geological samples (whole rocks, separate minerals).

The furnace according to the invention further has numerous features and advantages compared to all of the extraction techniques used to date in research laboratories, which may be summarized as follows.

Firstly, the single chamber of the furnace is metallic. This makes it possible to bake it up to 200° C. minimum in order to degas the inner walls of the chamber. It is by definition impermeable to noble gases of atmospheric origin. A furnace with a metal chamber makes it possible to avoid the problems encountered by induction furnaces with a glass chamber according to the prior art, namely a weakness of the structure with respect to the crucible when the latter is heated but especially a porosity of the walls with respect to helium. Specifically, this porosity helps to introduce into the chamber of induction furnaces with a glass chamber, large amounts of helium of atmospheric origin which mar the measurements with an additional uncertainty. This input may represent up to more than 99% of the total helium measured.

Next, the heating of the furnace according to the invention is of inductive type. This makes it possible to achieve temperatures above 1800° C. Therefore, the furnace according to the invention thus outperforms, in terms of heating power, the single-walled furnaces with resistive heating according to the prior art and the lamp furnaces according to the prior art, as presented in the prior art which may only reach 1400° C. and 1000° C. respectively.

In the furnace according to the invention, the crucible, preferably made of tantalum, is placed on an insulating support, preferably a ceramic. This makes it possible to avoid problems linked to the tantalum tube used in the double-walled furnaces according to the prior art, namely a recrystallization of the walls of the tube which induces a partial or total pumping of the extracted gases by the secondary pump unit used for this type of furnace and to an underestimation of the calculated concentrations of noble gases. This also enables the absence of mechanical and thermal stresses in the crucible since this simply rests on the insulating support, preferably made of ceramic.

The effect of the inductive heating combined with the absence of mechanical and thermal stresses in the crucible makes it possible to achieve a very high heating rate, namely less than 5 minutes to reach 1800° C. The cooling thereof is just as rapid. Currently, internationally, there are no laboratory furnaces, whether they are single-walled or double-walled resistance furnaces, bulb furnaces, or else induction furnaces, the chamber of which is made of glass, which have these features. The time saving when it comes to the heating, estimated by the inventors at around 15 to 20 minutes per extraction, undeniably improves the quality of the extraction of the noble gases from the samples by reducing in particular the noble gas blanks.

The features of the furnace according to the invention (maximum temperature, heating and cooling rate, analytical blank) are reliable and reproducible over time.

Moreover, the degassing rate of the crucible is rapid, a few hours at 1800° C. suffice. This also applies to the walls of the metal chamber, typically at 200° C. This makes it possible to rapidly obtain very satisfactory analytical conditions, namely residual amounts of noble gases of atmospheric origin in the chamber which are very low and therefore negligible with respect to those extracted from a sample. The first results relating to helium and neon place the furnace according to the invention among the best performing furnaces in terms of analytical blank. This is explained by the very high temperature obtained, of at least 1800° C., and by the low mass of the crucible to be degassed, typically of the order of 120 g. This same degassing is much longer with a glass induction furnace according to the prior art owing to a much longer temperature rise rate in order to minimize the thermal effects on the crucible holder. This is also true with a double-walled resistance furnace according to the prior art, owing to the high mass of the tantalum tube, typically of the order of 700 g and to the longer heating rate. This is finally true with a single-walled furnace according to the prior art, owing to a lower degassing temperature of the crucible (1400° C.).

Furthermore, certain geological samples have very low gas concentrations. This feature makes it necessary, to date, to melt large amounts of samples in order to extract enough noble gases to detect them. The crucible according to the invention may have a large volume, typically of the order of 15 cm³. This possible volume is up to 5 times greater than that proposed by the crucibles used in the glass induction furnaces according to the prior art. Thus this large possible volume for the crucible according to the invention makes it possible to envisage melting large amounts of a sample, typically 1 to 2 g per sample, in order to analyze the samples lean in gas. This feature is, for example, not accessible to techniques that use a laser as heating means, which are in fact limited by the diameter of the laser beam, to melt only a few tens of milligrams of sample per analysis. And, for reasons of exorbitant cost, it is not advised to use high-powered lasers having a surface area, at the focal point, large enough to melt 1 to 2 g of sample.

Furthermore, changing the crucible is very easy, since it rests only on an insulating support, preferably a ceramic. Changing the crucible in double-walled resistance furnaces according to the prior art is much more complicated, since this requires disassembling the tantalum tube with a risk of accidentally breaking the heating resistors, the replacement cost of which is very high. It is estimated at more than 12 000 €.

The maintenance cost of the furnace according to the invention is very low, since it consists only of a replacement of the crucible. Typically, the cost of a tantalum crucible amounts to 285 €. By comparison, the maintenance cost of single-walled resistance furnaces is higher, since it comprises, on the one hand, changing the crucible, currently of the order of 50 € and, on the other hand, the periodic replacement of the heating resistor, estimated at 350 €. The maintenance cost of double-walled resistance furnaces is even higher since it comprises changing the tantalum tube, estimated at 1500 € and the maintenance of the pump unit, which amounts to around 1500 € per service. Finally, the overall cost for the development of the furnace according to the invention equipped with an HF signal generator is perfectly acceptable for the purposes of commercialization. Compared to double-walled resistance furnaces and to techniques that use a laser ($CO_2$, diode, etc.) as heating means, the inventors estimate, as a first approach, that the cost of a furnace according to the invention may be up to 2 to 4 times less expensive.

According to one advantageous embodiment, the furnace comprises a heat-transfer fluid cooling circuit integrated into the lateral, lower and upper walls of the chamber. Preferably, the heat-transfer fluid is water.

According to one advantageous variant, the metal chamber consists of cylinders assembled together by welding and fastening flanges. Preferably the cylinders and fastening flanges are made of stainless steel, preferably of 304L and 316LN type respectively.

According to another advantageous variant, the distance between the induction coil and each of the lower, upper and lateral inner walls is at least equal to 10 mm.

The conductive crucible is preferably made of a material selected from tantalum (Ta), molybdenum (Mo), platinum (Pt), iron (Fe). In fact, any metal crucible may be suitable within the context of the invention.

The electrically insulating support is preferably made of a material selected from a ceramic, quartz. In practice, any material that is not electrically conductive may be suitable.

Preferably again, the electrically insulating tube is made of material selected from quartz, glass-ceramic, vitreous carbon. Other electrically insulating materials may be suitable.

According to one advantageous embodiment, the connection opening is connected to a bypass part for connecting the upper portion of the chamber both to the gas purification line and to a storage carousel as a gravity feed device for supplying a sample.

The furnace according to the invention may also have one and/or another of the following advantageous features:
- the lower end of the electrically insulating support is advantageously housed in a centering guide made in the lower inner wall of the chamber;
- the lower end of the electrically insulating tube is housed in a centering guide made in the lower inner wall of the chamber;
- the upper end of the electrically insulating tube is arranged as close as possible to the upper inner wall of the chamber.

DETAILED DESCRIPTION

Other advantages and features of the invention will emerge more clearly on reading the detailed description of exemplary embodiments of the invention given by way of illustration and nonlimitingly with reference to the following figures, among which:

FIG. 1 is a schematic longitudinal cross-sectional view of an HT UHV furnace of double-walled resistance type according to the prior art;

FIG. 2 is a schematic longitudinal cross-sectional view of an HT UHV furnace of the type with heating by electromagnetic induction in a glass chamber according to the prior art;

FIG. 3 is a schematic longitudinal cross-sectional view of an HT UHV furnace of bulb type according to the prior art;

FIG. 4 is a schematic longitudinal cross-sectional view of an HT UHV furnace of the type with heating by electromagnetic induction according to the invention;

For the sake of clarity, the same references denoting the same elements of a high-temperature ultrahigh-vacuum furnace according to the prior art and according to the invention are used for all the FIGS. 1 to 6A.

Figure 5A:
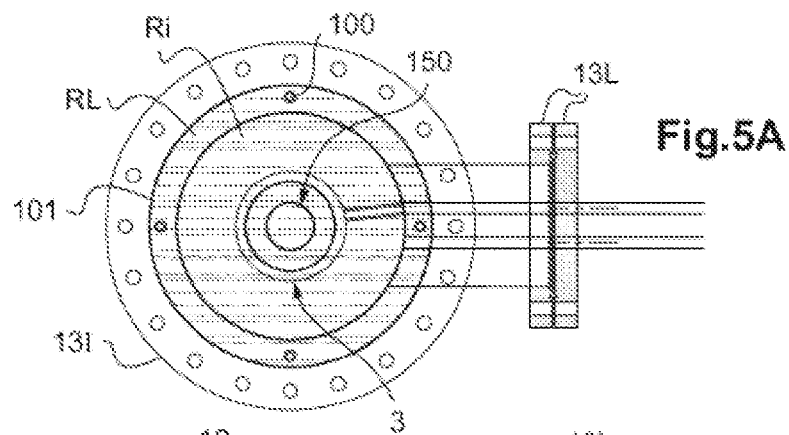
FIGS. 5A and 5B are respectively top and longitudinal cross-sectional views of the lower portion of the furnace according to FIG. 4.

Throughout the present application, the terms "vertical", "lower", "upper", "bottom", "top", "below", "above", "height" should be understood by reference relative to a furnace according to the invention with its chamber in a vertical operating configuration.

It is specified that the various elements according to the invention are represented solely for the sake of clarity and that they are not to scale.

It is also specified that the terms used for the CF flanges are those standard ones used for vacuum. Thus, CF flanges (also referred to as ConFlat flanges) are flanges with a knife edge and holes, are made of 304 or 316 stainless steel and are used for ultrahigh vacuum. The assembly consisting of a copper gasket sandwiched between two CF flanges is fastened with nuts and bolts. The sizes of the CF flanges are indicated by the internal nominal diameter DN in millimeters. CF flanges exist from 16 to 300 mm in diameter as standard (DN16 CF, DN40 CF, DN63 CF, DN100 CF, DN160 CF, DN200 CF, DN250 CF, DN300 CF).

FIGS. 1 to 3 relating to HT UHV furnaces according to the prior art have already been commented upon in the preamble. They are not therefore described in detail below.

An HT UHV furnace according to the invention as illustrated in FIGS. 4 to 6A will now be described.

The furnace according to the invention 1 firstly comprises a gastight metal chamber 10 delimited by an internal diameter Di, a height H and defining an internal volume V. In the example illustrated, Di=135 mm, H=101 mm, and V 1450 cm$^3$.

The metal chamber 10 consists of an upper portion 15 and a lower portion 11 joined together by two standard CF flanges 13S, 13I between which a copper gasket is inserted to ensure the leaktightness with respect to the atmosphere.

An upper flange 13C makes it possible to connect the inside of the chamber of the furnace to a gas purification line, not represented, by means of a pipe 19. In the example illustrated, the flanges 13S, 13I are DN 160 CF flanges, the upper flange 13C is of DN CF40 type and the gasket is of OFHC (oxygen free high conductivity) type. More specifically, the upper flange 13C is perforated at its center by a connection opening 4 for connection to a purification line for purifying the gases released in the chamber. Preferably the connection opening 4 is connected to a bypass part in order to connect the upper portion 15 of the chamber both to the gas purification line and to a storage carousel as a gravity feed device for supplying a sample.

Figure 5B:
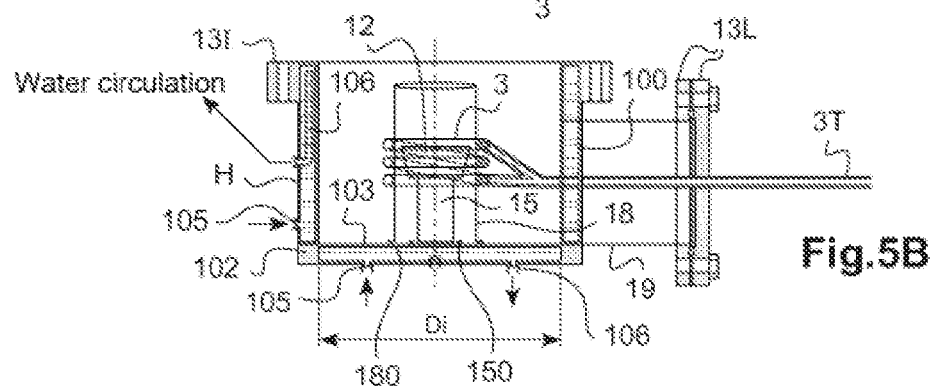

As illustrated in FIGS. 5 and 5A, the lower portion 11 of the chamber 10 comprises two hollow cylinders 100, 101 arranged concentrically by being welded via their upper end to the fastening flange 13I. In the example illustrated, the cylinders 100 and 101 have respective diameters of 159 mm and 135 mm. The lower portion of the cylinders 100, 101 is welded to a third cylinder 102 by means of a circular plate 103 that constitutes the lower inner wall of the chamber of the furnace.

The spacing between the cylinders 100 and 101 enables a circulation of water in order to prevent an overheating of these lateral walls of the furnace. The water inlet into this water cooling circuit RL is achieved using an intake tube 105 whilst the optimization of the filling is obtained by the discharge tube 106 welded between the two cylinders 100 and 101.

The third cylinder 102 is hollowed out at its center to enable a second circulation of water for cooling the lower inner wall 104 of the furnace. The water inlet into this water cooling circuit Ri is also achieved using an intake tube 105 and a discharge tube 106. These two tubes may be reversed since the flow direction of the water in the cylinder 102 is not important.

A first flange 13L with a pipe 19 is welded to the outer lateral cylinder 101 of the chamber. The pipe 19 is welded both to the cylinders 100 and 101 to guarantee perfect leaktightness of the chamber with respect to the atmosphere and the circulation of water. A second flange 13L is fastened to the first flange 13L with a pipe with the insertion of a copper gasket in order to obtain the leaktightness of the chamber with respect to the atmosphere. In the example illustrated, the flanges 13L are DN 63 CF flanges and the gasket is of OFHC type.

The second flange 13L is equipped with an electrical bushing 3T enabling the passage of HF (high frequency) electrical signals intended to supply the induction coil 3, preferably made of copper, arranged in the chamber. The bushing 3T preferably consists of two copper tubes welded to ceramics, themselves fastened in a leaktight manner to the flange 13L.

The induction coil 3 is welded to the two copper tubes of the electrical bushing 3T for the HF signals. Preferably, the coil is arranged at the center of the chamber 10.

A metal crucible 12, which is the site of the electromagnetic induction thermal phenomenon is placed on an electrically insulating support 15, preferably at the center of the chamber 10.

The crucible 12 is preferably made of tantalum since, besides the fact of being a refractory metal with a high melting point (3020° C.), it has the advantage of having a low rate of degassing of noble gases of atmospheric origin. However, other metals may be envisaged for the crucible 12 such as Mo, Pt, Fe, etc. By way of example, platinum is preferably envisaged for extracting nitrogen from geological samples since platinum remains chemically inert with respect to $N_2$, which is not the case for tantalum or molybdenum.

The support 15 is preferably made of ceramic since this is a pure material that degases little and withstands the temperature, and brief temperature variations, typically of the order of 400° C. per min. Moreover, the machining of the ceramic is easy. Any other material that is not electrically conductive may also be suitable, in particular quartz.

The number of turns 30 of the induction coil is calculated as a function of the geometry of the crucible 12 and of its mass. The distance between the induction coil 3 and the lateral 101, lower 103 and upper 104 inner walls is advantageously at least 30 mm, in order to minimize the effects of the induction on the metal chamber 10.

Preferably, a centering guide 150 is machined in the lower wall 103 in order to best position the support 15 at the center of the chamber. The height of the support 15 is calculated so as to position the crucible 12 at the center of the turns 30 of the induction coil 3.

An electrically insulating tube 18 is positioned between the induction turns 30 and the metal crucible 12. The tube is preferably made of quartz since this is a material which withstands the temperature. Any other tube made of a nonconductive material could be suitable, in particular a tube made of glass-ceramic or made of vitreous carbon. This tube 18 is provided to enable an easier cleaning of the chamber 10, since most of the condensable species will condense on the surface of the tube 18 and not on the walls of the chamber 10. The tube 18 also effectively protects the induction coil 3 against the condensation of the volatile species.

Advantageously, the upper end of the tube 18 is arranged as close as possible to the upper inner wall 104 of the chamber 10. In the example illustrated, the upper portion of the tube 18 is at a distance of the order of 2 to 3 mm from the upper wall 104 of the chamber. This short distance makes it possible to optimize the condensation phenomenon of the condensable gases on the tube 18 and not on the walls of the chamber. The tube 18, preferably made of quartz, is not very expensive, and will thus be able to be changed depending on the fouling thereof.

Preferably, a centering guide 180 is machined in the lower wall 103 in order to best position the tube 18 at the center of the chamber.

Figure 6A:
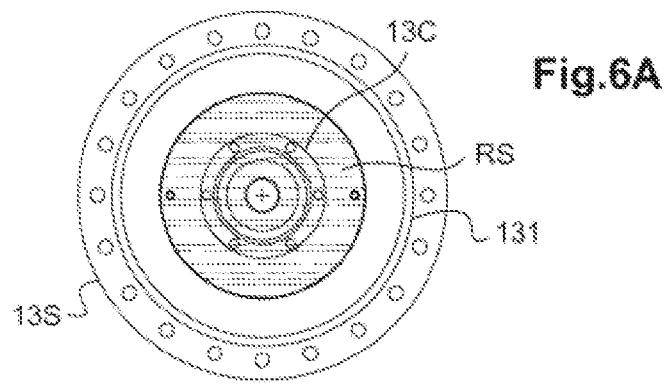
FIGS. 6A and 6B are respectively top and longitudinal cross-sectional views of the upper portion of the furnace according to FIG. 4.
Figure 6B:
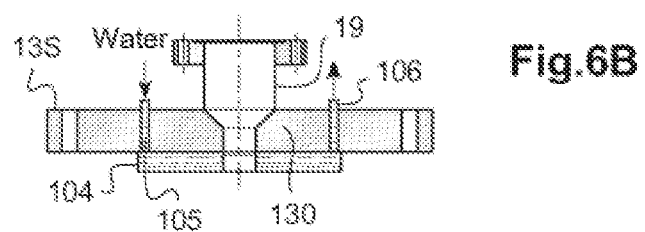

As illustrated in FIGS. 6 and 6A, the upper portion 1S of the chamber comprises a flange 13S to which the upper flange 13C with a pipe 19 has been welded. A cone 130 was machined in the flange 13S, in order to best guide the samples toward the crucible 12 during the descent thereof by gravity.

A fourth cylinder 104, constituting the upper inner wall, was welded to the flange 13S. The cylinder 104 is hollowed out to enable the circulation of water. The water inlet into this water cooling circuit Rs is also achieved using an intake tube 105 and a discharge tube 106.

These two tubes may be reversed since the flow direction of the water in the cylinder 104 is not important. This water circuit Rs must make it possible to prevent an overheating of the upper portion 1S of the chamber of the furnace. The flange 13C with a pipe 19 is perforated internally by a connection opening 4 for connecting the chamber of the furnace either to a sample-holder carousel or to a gas purification line. The assembly is connected to a mass spectrometer for the measurement of the noble gases.

All the fastening flanges 13S, 13I, 13L and 13C and also the pipes 19 and the cylinders 100, 101, 102, 103, 104, constituting the metal chamber are made of stainless steel of 304L and 316LN type. These steels have been selected advantageously for their good weldability and their very low helium permeability. Their mechanical strength allows a baking of the chamber 10 at 300° C. to desorb the chemical species adsorbed on the inner walls of the chamber. The material used for the lateral pipe flange 13L is preferably made of 316LN nonmagnetic stainless steel, in order to minimize the parasitic effects of the induction on the walls of the pipe 19.

The temperature of the crucible was measured through a glass window using an optical pyrometer sold under the name "Infratherm IS 8 plus" by Impac. A calibration of the temperature was obtained as a function of the heating parameters of an HF signal generator supplying the induction coil 3 through the bushing 3T.

As already described, all the surfaces of the metal chamber 10 of the furnace, namely the lateral 101, lower 103 and upper 104 surfaces, are cooled using a water circuit, respectively Ri, RL and Rs. Such a cooling is particularly effective since these surfaces remain cold despite the prolonged heating of the crucible 12 at 1850° C. It is specified that in the example illustrated, the pipe 19 of the lateral flange 13L is not equipped with a water cooling system. External fans may be used to limit the temperature to 70° C. at this level.

After its assembly, and in order to meet the cleanliness standards required for ultrahigh vacuum, the chamber was cleaned ultrasonically in three successive baths of detergent, of "Decon 90" trademark and a final bath of 99% ultrapure acetone. Between each bath, the chamber was rinsed with demineralized water. This cleaning procedure makes it possible to eliminate 99.95% of the hydrocarbons present in the chamber 10.

The inventors carried out several tests with the furnace according to the invention which has just been described, so as to validate the use thereof in the specialised laboratory in which they work. The tests are summarizsed below.

Reproductibility of the Heating

Figure 7:
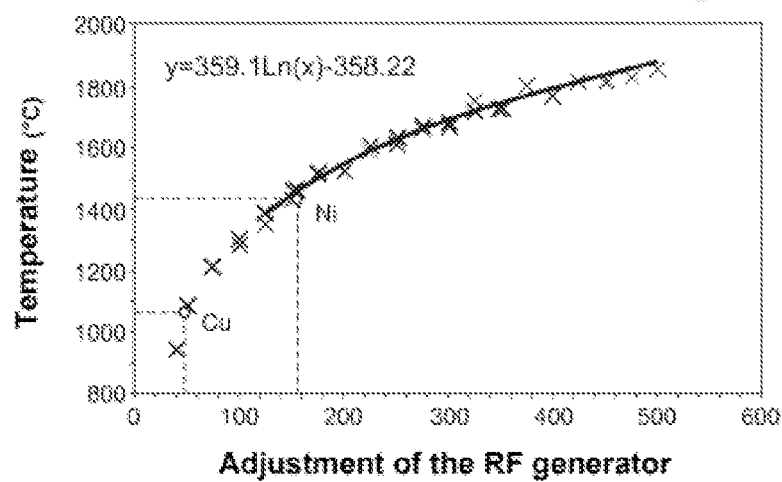
FIG. 7 illustrates, in graph form, the change in temperature of the crucible of a furnace according to the invention as a function of the adjustments of the induction generator.

The crucible was raised three times to high temperature. These three heating cycles were carried out over three successive days. All the measurements appear consistent and indicate a very good reproducibility of the heating. FIG. 7 illustrates the three heating cycles obtained. From these curves, it is observed that it is possible, from a logarithmic equation, to predict the temperature of the crucible as a function of the adjustments of the HF signal generator.

Maximum Temperature Reached

During these three heating cycles, a measurement at 1850° C. was able to be carried out with the optical pyrometer, used for calibration, which was adjusted for the emissivity of the tantalum.

It is possible to further increase this extreme temperature since the HF signal generator was only at 40% of its maximum power.

The furnace was opened after each heating cycle to verify the integrity of the furnace. The inventors were able to observe that no part inside the furnace (crucible 12, ceramic support, induction coil 3, quartz tube) had been adversely affected by the temperature.

Verification of the Measurements

Other temperature measurements were carried out using the optical pyrometer.

The melting of copper and nickel shavings in the crucible at temperatures respectively of 1060° C. and 1435° C. was observed.

These measurements are in agreement with the melting temperatures of these two metals found in the tables: see publication [31].

Heating and Cooling Rate

As already described, the tantalum crucible 12 is heated by induction. It rests on a ceramic support to limit the temperature losses by conduction.

Figure 8:
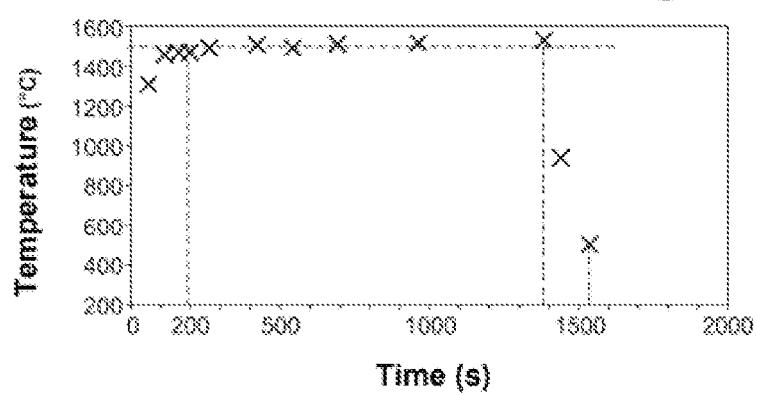
FIG. 8 illustrates, in graph form, the heating and cooling rate of the crucible of a furnace according to the invention.

FIG. 8 illustrates the temperature measurement points as a function of the time.

The temperature increase curve is extremely rapid since only 200 seconds are needed to stabilize the temperature of the crucible 12 at 1500° C.

The inventors consider that currently no high temperature UHV furnace exists that has this feature.

The crucible 12 also cools very rapidly when the HF signal generator is switched off since its mass and therefore its thermal inertness is low. Typically the mass of the crucible 12 does not exceed 120 g.

As emerges from FIG. 8, a duration of 160 seconds only is needed to reduce the temperature of the crucible from 1500° C. to a temperature below 500° C.

Temperature Stability

The parameters of the HF signal generator were chosen in order to obtain a temperature of 1500° C. The temperature, after 200 seconds, is stabilized and measurements thereof were carried out over a duration of around 20 minutes.

The average temperature during this test was 1499° C.±14° C.

This result appears to indicate that the furnace according to the invention has a satisfactory stability over a heating cycle.

Furnace Degassing Protocol: Analysis of Neon.

A degassing protocol of the furnace was developed in order to obtain very low residual amounts of neon (blank). An analytical blank represents the amount of gas degassed by all of the inner walls of a chamber. A low degassing of the chamber is the essential condition for analyzing samples lean in gas.

Each blank analysis was carried out after 25 minutes of heating the crucible 12 under static vacuum in order to simulate an extraction of gas.

|  | Temperature (° C.) (degassing time) | $^{20}$Ne (mol) |
|---|---|---|
| Degassing | 1800 (1 hour) |  |
| Crucible blank | 1500 | $9.84 \times 10^{-15}$ |
| Degassing | 1800 (2 hours) |  |
| Crucible blank (n = 1) | 1500 | $1.6 \times 10^{-16}$ |
| Crucible blank (n = 7) | 1500 | $5.82 \times 10^{-17}$ |

This protocol was developed after baking the chamber 10 of the furnace according to the invention at 160° C. for 24 hours.

The degassing of the crucible 12 is very effective in the chamber 10 of the furnace.

Two degassing cycles at 1800° C. for 3 hours made it possible to achieve very satisfactory neon blanks, namely $5.8 \times 10^{-17}$ mol of $^{20}$Ne degassed by the crucible at 1500° C. over 25 minutes. This value is perfectly compatible for being able to analyze samples lean in neon.

As emerges from Table 1 below, the comparison of this analytical result of the furnace according to the invention with other extraction systems, from laboratories of international reputation, categorises the furnace according to the invention among the best performing in the world.

It is specified that in tables 1 and 2, the following codes are used to specify the type of extraction system of the comparative examples according to the prior art:
(A): Double-walled resistance furnace
(B): Single-walled resistance furnace
(C): Laser
(D): Induction furnace with glass chamber

TABLE 1

| Examples Comparative examples | Type of extraction | Temperature in ° C. | Nature of the crucible | $^{20}$Ne blank ($\times 10^{-16}$ mol) |
|---|---|---|---|---|
| According to publication [9] | D | 1500 | — | 6.7 |
| According to publication [15] | D | 1500 | — | 6.69-11.15 |
| According to publication [16] | D | 1600 | Mo | 11.15 |
| According to publication [3] | A | 1500 | Ta | 4.5 |
|  |  | 1500 | Al$_2$O$_3$ | 22 |
| According to publication [10] | A | 1400 | Ta | 1.34-4.02 |
| According to publication [11] | A | 600-1500 | Ta | 1.75 |
|  |  | 600-1500 | Al$_2$O$_3$ | 26.29 |
| According to publication [12] | A | 1600 | MgO | 3.3 (average) |
|  |  | 1600 | BN | 3.5 (average) |
|  |  | 1600 | Mo | 4.5 (average) |
| According to publication [17] | A | 1650 | Mo | 26.77 |
| According to publication [18] | A | 1750-1800 | — | 0.04 |
| According to patent application FR2973105 | B | 1150 | BN | 2.0 |
|  |  | 1250 | BN | 31 |
| According to publication [13] | B | 2000 | W | 21.86 |
| According to publication [14] | B | 2200 | Ta | 0.02-7.14 |
| According to publication [30] | B | 1750 |  | 2.01 |
| According to publication [27] | C |  |  | 3.5-5 |
| According to publication [29] | C |  |  | 0.11 |
| According to publication [30] | C |  |  | 8.3 |
| Induction furnace according to the invention |  | 1500 | Ta | 0.58 |

It is perfectly conceivable to be able to further reduce these neon blanks by increasing the degassing temperature of the crucible to 1900° C. for example.

Furnace Degassing Protocol: Analysis of Helium

A degassing protocol of the furnace was developed in order to obtain very low residual amounts of helium (blank).

Heating the furnace at 1830° C. for 30 minutes under turbomolecular pumping makes it possible to reduce the degassing of the furnace to $1.4 \times 10^{-15}$ mol of $^4$He. These amounts are compatible for the extraction of helium in samples lean in gas.

From this table 2, it is observed that, by comparison with other furnaces from laboratories of international reputation, the analytical result classifies the furnace according to the invention among the best performing in the world for the extraction of helium.

TABLE 2

| | Type of extraction | Temperature in ° C. | Extraction time (min) | $^4$He blank ($\times 10^{-15}$ mol) |
|---|---|---|---|---|
| Examples Comparative examples | | | | |
| According to publication [4] | D | 600 | 30 | 46 |
| | | 1800 | | 90 |
| According to publication [9] | D | 1500 | | 847.7 |
| According to publication [15] | D | 1500 | | 446-669 |
| According to publication [16] | D | 1600 | | 669 |
| According to publication [8] | A | 1650 | 30 | 66.92 |
| According to publication [17] | A | 1650 | 30 | 17.85 |
| According to publication [10] | A | 600-1700 | | 20.08 |
| According to publication [12] | A | 800 | 30 | 64.25 |
| | | 1600 | 30 | 66.03 |
| | | 600-800 | 20-30 | — |
| | | 1600 | 20-30 | 48.18 |
| | | 1800 | 30 | 154.81 |
| | | 800 | 20 | — |
| | | 1600 | 20-30 | 75.40 |
| | | 1800 | 20 | 130.72 |
| According to publication [19] | A | 1600 | | 8.80 |
| According to publication [20] | A | 300-1500 | | 2.23-5.80 |
| According to publication [21] | A | — | | 1.33-1.78 |
| According to publication [22] | A | 1700 | | 0.33 |
| According to patent application FR2973105 | B | 1450 | | 1.12 |
| According to publication [14] | B | 2200 | | 0.268-3.569 |
| According to publication [13] | B | 2000 | 10 | 133.845 |
| According to publication [23] | B | 1700 | | 0.997-3.156 |
| According to publication [24] | C | | | 0.067-0.152 |
| According to publication [25] | C | 1300 | | 3.322 |
| According to publication [26] | C | >1200 | | 0.216 |
| According to publication [27] | C | | | 2.3-26 |
| According to publication [28] | C | | | 6 |
| According to publication [29] | C | | | 11.154 |
| Examples of induction furnace according to the invention | | | | |
| Example 1 | | 1750-1830 | 10 | 1.4 |

Furnace Degassing Protocol: Analysis of Xenon

A degassing protocol of the furnace was developed in order to obtain very low residual amounts of xenon (blank).

Heating the furnace at 1800° C. for three 30 minute cycles under turbomolecular pumping makes it possible to reduce the degassing of the furnace to $5.5 \times 10^{-18}$ mol of $^{132}$Xe. These amounts are compatible for the extraction of xenon in samples lean in gas.

From this table 3, it is observed that, by comparison with other furnaces from laboratories of international reputation, the analytical result classifies the furnace according to the invention at a similar level for the extraction of xenon.

TABLE 3

| | Type of extraction | Temperature ° C. | Nature of the crucible | $^{132}$Xe blank ($\times 10^{-16}$) |
|---|---|---|---|---|
| Example | | | | |
| According to publication [15] | D | 1500 | — | 0.004-0.009 |
| According to publication [9] | D | 1500 | Mo | 0.005 |
| According to publication [32] | D | 1850 | Ta | 0.194 |

TABLE 3-continued

|  | Type of extraction | Temperature ° C. | Nature of the crucible | $^{132}$Xe blank ($\times 10^{-16}$) |
|---|---|---|---|---|
| According to publication [16] | D | 1600 | Mo | 0.107 |
| According to publication [11] | A | 600-1500 | Ta | 0.022 |
| According to publication [17] | A | 1650 | Mo | 0.223 |
|  |  | 1600 | MgO | 0.072 (average) |
|  |  | 600-800 | BN | 0.020 (average) |
|  |  | 1600 | BN | 0.045 (average) |
|  |  | 1800 | BN | 0.052 (average) |
|  |  | 1600 | Mo | 0.140 (average) |
|  |  | 1800 | Mo | 0.058 (average) |
| According to publication [33] | B | 2150 | Ta | 0.178 |
| According to publication [13] | B | 2000 | W | 0.004 |
| According to publication [13] | B | 2050 | — | 0.020 |
| Examples of induction furnace according to the invention |  |  |  |  |
| Example 1 |  |  |  | 0.055 |

In view of these results, and owing to very good reproducibility of the tests and an excellent reliability of the furnace according to the invention (heating power, heating and cooling rate), the laboratory within which the inventors work has decided to use the furnace according to the invention routinely in the laboratory for extracting neon, xenon and helium at the same time in minerals (quartz, pyroxene, olivine, etc.).

Moreover, the results obtained equally as neon blanks, xenon blanks and helium blanks are very encouraging and lead the inventors to believe that the Ar and Kr blanks may be very low with a furnace according to the invention as has been described.

Other variants and improvements may be provided without however departing from the scope of the invention.

The invention is not limited to the examples which have just been described; it is in particular possible to combine together features from illustrated examples within variants that are not illustrated.

CITED REFERENCES

[1]: Zimmermann L. and Marty B. "Méthodes d'extraction des gaz rares sous ultravide" [Method for extracting noble gases under ultrahigh vacuum], Les techniques de l'ingénieur, J6632 (2014).

[2]: T Staudacher, E K Jessberger, D Dorflinger and J Kiko. "A refined ultrahigh-vacuum furnace for rare gas analysis", Journal of Physics E: Scientific Instruments 1978, Volume 11, Number 8, 781-784.

[3]: Takaoka N. "A low-blank, metal system for rare-gas analysis", Mass Spectrometry, 24, No. 1, 73-86 (1976).

[4]: Marty B., Lenoble M. and Vassard N. "Nitrogen, helium and argon in basalt: A static mass spectrometry." Chemical Geology (Isotope Geoscience Section), 120, 183-195 (1995).

[5]: Chennaoui-Aoudjehane H., Modélisation de la solubilité des gaz rares He, Ne, Ar, Kr et Xe dans les liquides silicatés à 1500° C. [Modelling the solubility of the noble gases He, Ne, Ar, Kr and Xe in silicate-containing liquids at 1500° C.]. Thesis 138 p. (1992)

[6]: Farley K. A., Reiners P. W., and Nenow V., "An apparatus for high-precision helium diffusion measurements from minerals", Anal. Chem., 71 2059-2061 (1999).

[7]: Humbert, F., Libourel, G., France-Lanord, C., Zimmermann, L., & Marty, B. "$CO_2$-laser extraction-static mass spectrometry analysis of ultra-low concentrations of nitrogen in silicates." Geostandards Newsletter, 24(2), 255-260(2000).

[8]: Foeken J. P. T., Stuart F. M., Dobson K. J., Persano C. and Vilbert D., A diode laser system for heating minerals for (U-Th)/He chronometry, Geochemistry, Geophysics, Geosystem, 7, No 4, 1-9 (2006)

[9]: Moreira M. and Allègre C. J. "Rare gas systematics on Mid Atlantic Ridge (37-40° N)" Earth and Planetary Science Letters, 198, 401-416 (2002).

[10]: Niedermann S, Bach W. and Erzinger. J "Noble gas evidence for lower mantle component in MORBs from the Southern East Pacific Rise: Decoupling of helium and neon isotope systematics" Geochemica et Cosmochimica Acta, 61, 2697-2715 (1997).

[11]: Honda M., McDougall I., Patterson D. B., Doulgeris A. and Clague D. A. "Noble gases in submarine pillow basalt glasses from Loihi and Kilauea, Hi.: A solar component in the Earth", Geochemica et Cosmochimica Acta, 57, 859-874 (1993).

[12]: Maruoka T. and Matsuda J. "New crucible for noble gas extraction" Chemical Geology, 175, 751-756 (2001).

[13]: Honda M., Reynolds J. H., Roedder E. and Epstein S. "Noble gases in diamonds: Occurrences of solarlike helium and neon", Journal of Geophysical Research, 92, No. B12, 12.507-12521 (1987).

[14]: Sumino H., Dobrzhinetskaya L. F., Burgess R. and Kagi H. "Deep-mantle-derived noble gases in metamorphic diamonds from the Kokchetav massif; Kazakhstan", Earth and Planetary Science Letters, 307, 439-449 (2011).

[15]: Becker R. H. and Pepin R. O. "The case for a Martian origin of the shergottites: nitrogen and noble gases in EETA 79001", Earth and Planetary Science Letters, 69, 225-242 (1984).

[16]: Ott U. "Noble gases in SNC meteorites: Shergotty, Nakhla, Chassigny", Geochimica et Cosmochimica Acta, 52, 1937-1948 (1988).

[17]: Jambon, A., Weber, H., Braun, O. "Solubility of He, Ne, Ar, Kr and Xe in a basalt melt in the range 1250-160° C.: Geochemical implications", Geochemica et Cosmochimica Acta 50, 401-408, (1986).

[18]: Lavielle B., Marti K., Jeannot J. P., Nishiizumi K. and Caffee M. "The 36Cl-36Ar-40K-41K records and cosmic ray production rates in iron meteorites", Earth and Planetary Science Letters, 170, 93-104 (1999).

[19]: Blard, P.-H. and Pik, R. "An alternative isochron method for measuring cosmogenic $^3$He in lava flows." Chemical Geology, 251 (1-4). pp. 20-32. ISSN 0009-2541. (2008).

[20]: Aciego S. M., Depaolo D. J., Kennedy B. M., Lamb M. P., Sims K. W. W. and Dietrich W. E. "*Combining 3He cosmogenic dating with U-Th/He eruption ages using olivine in basalt*", Earth and Planetary Science Letters, 254, 288-302 (2007).

[21]: Kurz M. "*In situ production of terrestrial cosmogenic helium and some application to geochronology*", Geochimica et Cosmochimica Acta, 50, 2855-2862 (1986).

[22]: Williams A. J., Stuart F. M., Day S. J. and Phillips W. M. "*Using pyroxene microphenocrysts to determine cosmogenic 3He concentrations in old volcanic rocks; an example of landscape development in central Gran Canaria*", Quaternary Science Reviews, 24, 211-222 (2005).

[23]: Blard P. H., Pik R., Lavé J., Bourlès D., Burnard P. G., Yokochi R., Marty B. and Trusdell. "*Cosmogenic 3He production rates revisited from evidences of grain size dependent release of matrix-sited helium*", Earth and Planetary Science Letters, 247, 222-234 (2006).

[24]: Ammon K., Dunai T. J., Stuart F. M., Meriaux A.-S. and Gayer E. "*Cosmogenic 3He exposure ages and geochemistry of basalts from Ascension Island, Atlantic Ocean*", Quaternary Geochronology, 4, 525-532 (2009).

[25]: Farley K. A., Libarkin J., Mukhopadhyay S. and Amidon W. "*Cosmogenic and nucleogenic 3He in apatite, titanite, and zircon*", Earth and Planetary Science Letters, 248, 451-461 (2006).

[26]: Foeken J. P. T., Day S. and Stuart F. M. "*Cosmogenic 3He exposure dating of the quaternary basalt from Fogo, Cape Verdes: Implications for rift zone and magmatic reorganization*", Quaternary Geochronology, 4, 37-49 (2009).

[27]: Füri E., Aléon-Toppani A., Marty B. and Libourel G. "*Effects of atmospheric entry heating on the noble gas and nitrogen content of micrometeorites*", Earth and Planetary Science Letters, 377-378, 1-12 (2013).

[28]: Pi T., Solé J. and Taran Y. "*(U-Th)/He dating of fluorite: application to the La Azul fluorspar deposit in the Taxco mining district, Mexico*", Mineralium Deposita, 39, 976-982 (2005).

[29]: Nichols R. H. Jr., Hohenberg C. M. and Olinger C. T. "*Implanted solar helium, neon, and argon in individual lunar ilmenite grains: Surface effects and a temporal variation in the solar wind composition*", Geochimica et Cosmochimica Acta, 58, 1031-1042 (1994).

[30]: Vermeesch P., Balco G., Blard P. H., Dunai T. J., Kober F., Niedermann S., Shuster D. L., Strasky S., Stuart F. M., Wieler R. and Zimmermann L. "*Interlaboratory comparison of cosmogenic $^{21}Ne$ in quartz*", Quaternary Geochronology, 26, 20-28 (2015).

[31]: CRC Handbook of Chemistry and Physics, $97^{th}$ Edition.

[32]: Pujol M. "*Géochimie des éléments volatils dans les roches archéennes: caractérisation des environnements anciens*" [Geochemistry of volatile elements in Archean rocks; characterization of ancient environments], Thesis XXXp (2009).

[33]: Burgess R., Cartigny P., Harrison D., Hobson E. and Harris J. "*Volatile composition of microinclusions in diamonds from the Panda kimberlite, Canada: Implications for chemical and isotopic heterogeneity in the mantle*", Geochimica et Cosmochimica Acta, 73, 1779-1794 (2009).

[34]: Johnson L. H., Burgess R., Turner G., Milledge H. J. and Harris J. W. "*Noble gas and halogen geochemistry of mantle fluids: Comparison of African and Canadian diamonds*", Geochimica et Cosmochimica Acta, 64, 717-732 (2000).

The invention claimed is:

1. A high-temperature ultrahigh-vacuum furnace, intended for the extraction of noble gases present in samples of minerals and/or rocks, comprising:
   a metal chamber that is gastight comprising a first connection opening for connecting to a purification line for purifying the gases released in the chamber and/or to a gravity feed device for supplying a sample and, a second connection opening for connecting to a pump suitable for creating the ultrahigh vacuum inside the chamber,
   a crucible made of electrically conductive material, suitable for containing at least one sample of minerals and/or rocks,
   a support made of electrically insulating material, resting on a lower portion of the metal chamber, and supporting the crucible in the chamber,
   at least one induction coil, powered from outside of the chamber through at least one insulated bushing passing through a wall of the chamber, and arranged around the crucible,
   a tube made of electrically insulating material, resting on the lower portion of the metal chamber, arranged between the induction coil and the crucible supported by the support,
   wherein the first connection opening is connected to a bypass part for connecting an upper portion of the chamber both to the purification line and to a storage carousel as a gravity feed device for supplying a sample.

2. The high-temperature ultrahigh-vacuum furnace as claimed in claim 1, comprising a heat-transfer fluid cooling circuit integrated into lower and upper walls of the chamber.

3. The high-temperature ultrahigh-vacuum furnace as claimed in claim 1, wherein the metal chamber consists of cylinders assembled together by welding and fastening flanges.

4. The high-temperature ultrahigh-vacuum furnace as claimed in claim 3, wherein the cylinders and fastening flanges being made of stainless steel.

5. The high-temperature ultrahigh-vacuum furnace as claimed in claim 1, wherein the distance between the induction coil and each of lower, upper and lateral inner walls is at least equal to 10 mm.

6. The high-temperature ultrahigh-vacuum furnace as claimed in claim 1, wherein the conductive crucible is made of a material selected from tantalum (Ta), molybdenum (Mo), platinum (Pt), iron (Fe).

7. The high-temperature ultrahigh-vacuum furnace as claimed in claim 1, wherein the electrically insulating support is made of a material selected from a ceramic, quartz.

8. The high-temperature ultrahigh-vacuum furnace as claimed claim 1, wherein the electrically insulating tube is made of a material selected from quartz, glass-ceramic, vitreous carbon.

9. The high-temperature ultrahigh-vacuum furnace as claimed in claim 1, wherein the lower end of the electrically insulating support is housed in a centering guide made in a lower inner wall of the chamber.

10. The high-temperature ultrahigh-vacuum furnace as claimed in claim 1, wherein the lower end of the electrically insulating tube is housed in a centering guide made in a lower inner wall of the chamber.

11. The high-temperature ultrahigh-vacuum furnace as claimed in claim 1, wherein an upper end of the electrically insulating tube is arranged as close as possible to an upper inner wall of the chamber.

\* \* \* \* \*